UNITED STATES PATENT OFFICE.

WILLIAM CLOUGH, OF CINCINNATI, OHIO.

IMPROVED PROCESS OF DEODORIZING AND REFINING SACCHARINE AND OTHER FLUIDS.

Specification forming part of Letters Patent No. 75,245, dated March 10, 1868; antedated February 28, 1868.

*To all whom it may concern:*

Be it known that I, WILLIAM CLOUGH, of Cincinnati, in the county of Hamilton and State of Ohio, have discovered a new and Improved Process of Deodorizing and Refining Saccharine and other Fluids; and I do hereby declare the following to be a full, clear, and exact description of the same.

My newly-discovered process consists in the use of soluble silica or the soluble silicate of soda or potassa as a refining agent and finely-ground barytes or other appropriate heavy powder, the latter being used to give gravity to the precipitate or coagulum produced by the former.

This refining agent and its accompanying heavy powder may be used in varying proportions and in various modes, and I do not therefore restrict myself to any specific proportions, quantities, or modes of using them. These may be varied somewhat to suit the convenience of the operator, and require to be varied to adapt them to different solutions or to different conditions of the same solution. The means of determining these points will be explained so far as the same can be done within proper limits.

I shall, in this specification, describe my newly-discovered process in connection with the refining of cane-juice and other saccharine fluids, as this will explain the nature of the process and enable the operator to employ it intelligently in refining other fluids to which the process is applicable.

In operating upon saccharine fluids which have been reduced to the density of sirup or molasses, they should be first diluted to the consistency of semi-sirup—say to 20° Baumé, or less. Molasses of the tropical cane may be treated at a greater density than the more viscid sirup of sorghum. With the latter I have found it best to dilute to about 16° Baumé. If the refining process is to be applied in the original operation of making sirup or sugar from the green juice, it may be applied at any state of concentration not much exceeding the density above named.

To the solution, either cane-juice, beet-juice, or dilute sirup, first add the barytes or other heavy powder, thoroughly stirring it into the fluid. The quantity to be used need not be definitely stated, as the powder is employed simply for the purpose of giving gravity to the precipitate which is produced by the silica and causing it to subside. With barytes I usually add enough to produce a visible hue of white upon the liquid—a solution of considerable density—say of 16° or 18° Baumé, requiring about one table-spoonful to a gallon. If an earth or powder of less specific gravity is used, the quantity must be greater to produce a corresponding effect. With solutions of less density less of the powder is required. A heavy powder like barytes causes the impurities or separated matter to subside into a small compass, and this should be preferred, unless, for other purposes, bone, coal-dust, or some other powder should be employed.

After adding the powder the fluid should be tested with litmus-paper; and if free acid is indicated, this should be neutralized with lime or other alkaline agent.

The solution of silica or silicate is next to be added. It is better to have this agent prepared in a dilute state—say, at a density of 5° or 10° Baumé, as in this form it is more conveniently mixed and incorporated with the fluid. The quantity of silica appropriate to be used varies considerably with different solutions. It is best to use no more than will suffice to refine thoroughly. I have found that with solutions of 16° to 18° density one part of silicate of 10° density to one hundred parts of the solution answered well. Silicates of different manufactures differ considerably in their capacities, some being much more silicious. Sirups or solutions of less density require smaller proportions of silica. Very impure viscid sirups yield a dense precipitate, and refine quite clear with smaller proportions of silica than are required for comparatively pure sirups. As it is not practicable to give exact quantities or proportions adapted to all circumstances, the operator, when employing the process for the first time upon any particular kind of fluid or sirup, should test the same in a small way before proceeding with a large operation. For this purpose an ordinary test-tube, or a thin white glass vial, which will bear to be held in the flame of a lamp, will answer. Fill this with the prepared solution and boil it. A perfect coagulation should appear as the liquid comes to the boiling-point. In a very few minutes the separated impurities should subside, leaving the fluid perfectly clear. If this occur, and if the impurities settle into a small compact mass at the bottom, the proportions may be understood to be correct; but if the precipitate is without cohesion, and in settling leaves the solution somewhat turbid and impure, the quantity of silica was insufficient and more must be employed; but the additional quantity may be very little to produce the desired effect. On the other hand, should the precipitate appear dense and settle sluggishly, forming a bulky sediment, it may be understood that an excess of silica is present, and the relative proportion must be reduced.

The solution having been treated for refining, as has been explained, is next to be brought to the boiling-point, after which it should be removed from the fire into settling-tanks and allowed to remain quiet until the impurities subside, after which the clear liquor may be drawn off from above the sediment, and is then ready to be boiled down to a proper density for sugar or sirup.

The silica or silicate may be added to the solution before it is neutralized with lime, if more convenient.

What I claim as my discovery, and desire to secure by Letters Patent of the United States, is—

The process of refining and deodorizing saccharine and other fluids herein specified.

WM. CLOUGH.

Witnesses:
 JOHN S. HOLLINGSHEAD,
 A. L. NEWTON.